US008321513B2

(12) United States Patent
Ganz et al.

(10) Patent No.: US 8,321,513 B2
(45) Date of Patent: Nov. 27, 2012

(54) MULTIPLE-LAYER CHAT FILTER SYSTEM AND METHOD

(75) Inventors: Howard Ganz, North York (CA); Karl Joseph Borst, Toronto (CA)

(73) Assignee: Ganz, Woodbridge, Ontario ( * ) Notice: Subject to any disclaimer, the term of this patent is extended or adjusted under 35 U.S.C. 154(b) by 239 days.

(21) Appl. No.: 12/042,045

(22) Filed: Mar. 4, 2008

(65) Prior Publication Data
US 2009/0228557 A1 Sep. 10, 2009

(51) Int. Cl.
*G06F 15/16* (2006.01)

(52) U.S. Cl. ...................................... 709/206

(58) Field of Classification Search ................... 709/206
See application file for complete search history.

(56) References Cited

U.S. PATENT DOCUMENTS

| | | | |
|---|---|---|---|
| 5,736,982 A | 4/1998 | Suzuki et al. | |
| 5,880,731 A | 3/1999 | Liles et al. | |
| 5,987,606 A | 11/1999 | Cirasole | |
| 6,519,771 B1 | 2/2003 | Zenith | |
| 6,704,784 B2 | 3/2004 | Matsuda | |
| 6,773,325 B1 | 8/2004 | Mawle et al. | |
| 6,773,344 B1 | 8/2004 | Gabai et al. | |
| 6,910,186 B2 | 6/2005 | Kim | |
| 7,171,154 B2 | 1/2007 | Fujisawa | |
| 7,549,119 B2* | 6/2009 | McCaffrey et al. | 715/234 |
| 8,036,937 B2 | 10/2011 | Tang et al. | |
| 8,118,673 B2* | 2/2012 | Coleman et al. | 463/31 |
| 2002/0068500 A1 | 6/2002 | Gabai et al. | |
| 2002/0198940 A1* | 12/2002 | Bower et al. | 709/204 |
| 2004/0003398 A1 | 1/2004 | Donian et al. | |
| 2004/0043806 A1 | 3/2004 | Kirby et al. | |
| 2004/0093266 A1 | 5/2004 | Dohring | |
| 2004/0111479 A1* | 6/2004 | Borden et al. | 709/206 |
| 2004/0154022 A1 | 8/2004 | Boss et al. | |
| 2004/0242326 A1 | 12/2004 | Fujisawa et al. | |
| 2004/0249626 A1 | 12/2004 | Neal | |
| 2005/0059483 A1 | 3/2005 | Borge | |

(Continued)

FOREIGN PATENT DOCUMENTS

WO 01/69829 A2 9/2001

(Continued)

OTHER PUBLICATIONS

Mattel, Inc. "BarbieGirls.com message to parents" Apr. 20, 2007. p. 1. http://web.archive.org/web/ 200704 20071218/ http://www.barbiegirls.com/legal/parents.html.*

(Continued)

*Primary Examiner* — Imad Hussain (74) *Attorney, Agent, or Firm* — Pearne & Gordon LLP (57) ABSTRACT

A computer network-based messaging system includes a multiple-layer chat filtering system for controlling the content of messages sent by users. A computer receives a message including a plurality of words entered by a sender. A word database includes a plurality of permitted words which are allowed to be transmitted. A phrase database includes a plurality of prohibited phrases which are not allowed to be transmitted. At least one of the plurality of prohibited phrases consists of a plurality of individual words that are each included in the word database. A message sending part that transmits the message over a computer network only if all of the plurality of words entered by the sender are contained in the word database and none of the plurality of prohibited phrases are contained in the message.

22 Claims, 3 Drawing Sheets

U.S. PATENT DOCUMENTS

| | | | |
|---|---|---|---|
| 2005/0177428 A1 | 8/2005 | Ganz | |
| 2005/0250415 A1 | 11/2005 | Barthold | |
| 2005/0250416 A1 | 11/2005 | Barthold | |
| 2006/0123127 A1 | 6/2006 | Littlefield | |
| 2006/0253784 A1* | 11/2006 | Bower et al. | 715/738 |
| 2006/0277167 A1* | 12/2006 | Gross et al. | 707/3 |
| 2006/0293103 A1* | 12/2006 | Mendelsohn | 463/42 |
| 2007/0174408 A1 | 7/2007 | Paul et al. | |
| 2007/0250587 A1* | 10/2007 | Roberts | 709/206 |
| 2008/0163055 A1 | 7/2008 | Ganz et al. | |
| 2008/0168095 A1 | 7/2008 | Larcombe et al. | |
| 2008/0221998 A1 | 9/2008 | Mendelsohn et al. | |

FOREIGN PATENT DOCUMENTS

| | | | |
|---|---|---|---|
| WO | 2006128224 A1 | 12/2006 | |

OTHER PUBLICATIONS

Mattel, Inc. "BarbieGirls.com message to parents" May 2, 2007. pp. 1-2. http://web.archive.org/web/20070502135908/http://www.barbiegirls.com/legal/parents_text.html.*

Search Report dated Jun. 5, 2009 for application No. PCT/CA2009/000271, filed Mar. 4, 2009.

Grace, "Web Site Tycoon's Next Goal: Sixth Grade"; Woonsocket Call, Jun. 19, 2002.

http://web.archive.org.web.20031202190119/www.monopets.com/, Dec. 2, 2003.

Klotz, Hattie, "Look Out, Pokemon; Neopets are Taking Over", The Ottawa Citizen, p. A.1.FRO, Apr. 10, 2008.

Matsuda, Kouichi, et al. "Culture Formation and its Issues in Personal Agent-oriented Virtual Society—"PAW'2"." Collaborative Virtual Environments (2002): 17-24.

"Barbie Girls Tips for Parents", Mattel, Inc., http://www.barbiegirls.com/legal/parents_text.html, downloaded on May 23, 2007.

"Barbie Revolutionizes The Way Girls Play", Mattel, Inc., http://investor.shareholder.com/common/download/download.cfm?companyid=MAT&fileid=224357& filekey=581 edc95-c0d3-45f5-a6dc-cb3c2ab50331&filename=239128.pdf, downloaded on Mar. 29, 2011.

* cited by examiner

MULTIPLE-LAYER CHAT FILTER SYSTEM AND METHOD

BACKGROUND

The present invention relates generally to computer network-based messaging systems, including so-called chat rooms, and more specifically to a method of filtering undesirable words and phrases in a chat room and to a chat system including a chat filter incorporating such method.

With the evolution of increasingly sophisticated Internet tools and the widespread availability of broadband Internet connections, the World Wide Web ("Web") experience is moving steadily beyond the passive dissemination of information, towards real-time interaction between simultaneous users. Virtual communities exist for groups that share every conceivable interest, hobby, or profession. Increasingly more people of all ages use the Internet as a place to meet and to interact with other people for work and for play. As a consequence, chat rooms have become ubiquitous on the Internet, and accordingly, the maintenance of behavioral standards and safety, especially for young people and minors, is becoming a major societal concern.

Consequently, administrators of chat sites face challenges related to maintaining standards of conduct to prevent a site from degenerating into a forum for types of discussion that were never intended. One such challenge is how to maintain standards within an environment like the Internet where the participants are anonymous and therefore cannot be held accountable with traditional methods. Around-the-clock real-time monitoring by the administrator is not economically feasible for most Internet businesses.

One common approach is to use basic word filters to eliminate offensive words and profanity from the chat conversation. Such filters, often referred to as "black lists" or "exclusive" filters, generally involve blocking words and/or phrases contained in a black list or exclusive dictionary. Unfortunately such simplistic black list approaches can never be exhaustive and are easily outwitted by the well-known practice of "obfuscation." This practice, also known by other labels such as "creative misspelling," involves users purposely misspelling words or phrases in a chat message in order to prevent the detection of the words or phrases by exclusive word filters, while still permitting the meaning of the words to be understood by human readers.

Another limitation of these exclusive filters is that, depending on the needs of a chat site, certain words and phrases that are neither profanity nor generally offensive may need to be discouraged in order to preserve certain specific site standards. For example, in a community site for children who do not fully grasp the importance of password safety, phrases like "what's your password," "gimme your pass," and "my password is" need to be discouraged. Furthermore, these needs arise dynamically out of the needs of a community and continually evolve. Accordingly, the ongoing task of maintaining a black list of all prohibited words and phrases requires devoting a tremendous amount of resources to constantly monitoring chat room conversations and updating the blacklist as new offensive language evolves. This is not practical or economically feasible for most Internet businesses. Furthermore, there will always be some delay in updating the black list based on monitoring, since it is nearly impossible for the administrator to anticipate all of the creative misspellings and word combinations that will need to be blocked.

Another approach is to use a more restrictive form of chat filtering, known is "white list" or "inclusive" filtering. Such filters prevent the use of offensive words, as well as the use of word obfuscation, since they only allow words contained in a list of approved words, known as a "white list" or "inclusive dictionary." However, in order to effectively block the use of offensive language, the white list must be kept relatively small, which can significantly hinder the ability of users to effectively chat with each other.

BRIEF SUMMARY

According to an aspect of the present invention, there is provided a computer network-based messaging system including a multiple-layer chat filtering system for controlling the content of messages sent by users in the messaging system. A computer receives a message including a plurality of words entered by a sender. A word database includes a plurality of permitted words which are allowed to be transmitted. A phrase database includes a plurality of prohibited phrases which are not allowed to be transmitted. At least one of the plurality of prohibited phrases consists of a plurality of individual words that are each included in the word database. A message sending part that transmits the message over a computer network only if all of the plurality of words entered by the sender are contained in the word database and none of the plurality of prohibited phrases are contained in the message.

According to a further aspect of the present invention, there is provided a method of filtering phrases in a computer network-based chat system. The method comprises steps of: providing a word database containing a plurality of permitted words; providing a phrase database containing a plurality of prohibited phrases, at least one of the plurality of prohibited phrases consisting of a plurality of individual words that are each included in the word database; receiving a message from a sender's computer, the message including a plurality of words; comparing each of the plurality of words to the plurality of permitted words in the word database; determining whether any of the plurality of prohibited phrases are contained in the message; and transmitting the message over a computer network only if both of the following conditions exist: (1) each of the plurality of words entered by the sender matches one of the plurality of permitted words contained in the word database, and (2) none of the plurality of prohibited phrases are contained in the message.

DETAILED DESCRIPTION

As described above, a significant limitation of a conventional inclusive or white list-style chat filter is that it is only effective in blocking individual offensive words if the white list is kept relatively small, which can considerably impede effective communication between users. Furthermore, it has been recognized by the inventors of the present invention that such an inclusive filter will not block an offensive phrase as long as it is composed of words that are included in the white list. For example, an administrator of a chat site for children attempting to prevent the use of phrases such as "you are stupid" would might eliminate words such as "stupid" and "dumb," as well as related words and synonyms, from the white list. However, this would not prevent phrases having the same meaning, such as "you are not smart" from being used. Further, following this line of reasoning, it is easy to imagine how extremely offensive phrases can be composed using words that are completely innocent in and of themselves, such as by creating innocuous-sounding euphemisms. Thus, for these and other reasons, inclusive (white list) filtering can be easily outwitted and it is completely unable to block offensive or inappropriate phrases that are composed of non-offensive words.

Further, as described above, one limitation of a conventional exclusive or black list-style chat filter is that it is only effective in blocking individual offensive words if an extensive black list is provided, particularly if the blacklist is made to include an extensive collection of known obfuscations or misspellings of offensive words in addition to offensive words themselves. Furthermore, it has been recognized by the inventors of the present invention that a black list-style filter is much less effective in blocking offensive phrases that are composed of two or more non-offensive words. To block such phrases, the black list would have to explicitly include each and every offensive phrase, since the individual words making up the phrases would not be blocked. Because there are so many possible word-combinations that would need to be included in the black-list, this approach is generally not very practical, nor is it very effective. For example, by most estimates the English language includes hundreds of thousands of words. One can easily see that an astronomical number of permutations of word-combinations exist from which potentially offensive phrases can be formed and, by adding misspellings the number begins to approach infinity. Thus, the size of the black list that would be needed to effectively filter all offensive phrases makes it generally impractical.

According to an aspect of the present invention, by significantly decreasing the number of words that must be considered by a phrase filter, it becomes more practical to maintain a comprehensive black list of offensive phrases. That is, if there are fewer words to choose from, then there will be fewer phrases that can be formed, and as a result, the size of the black list can be substantially reduced. As will be better understood from the examples provided below, the number of words available for use by exclusive (black list) phrase filter is reduced by employing an inclusive (white list) word filter in combination with the exclusive filter in order to filter offensive chat phrases.

Figure 1:
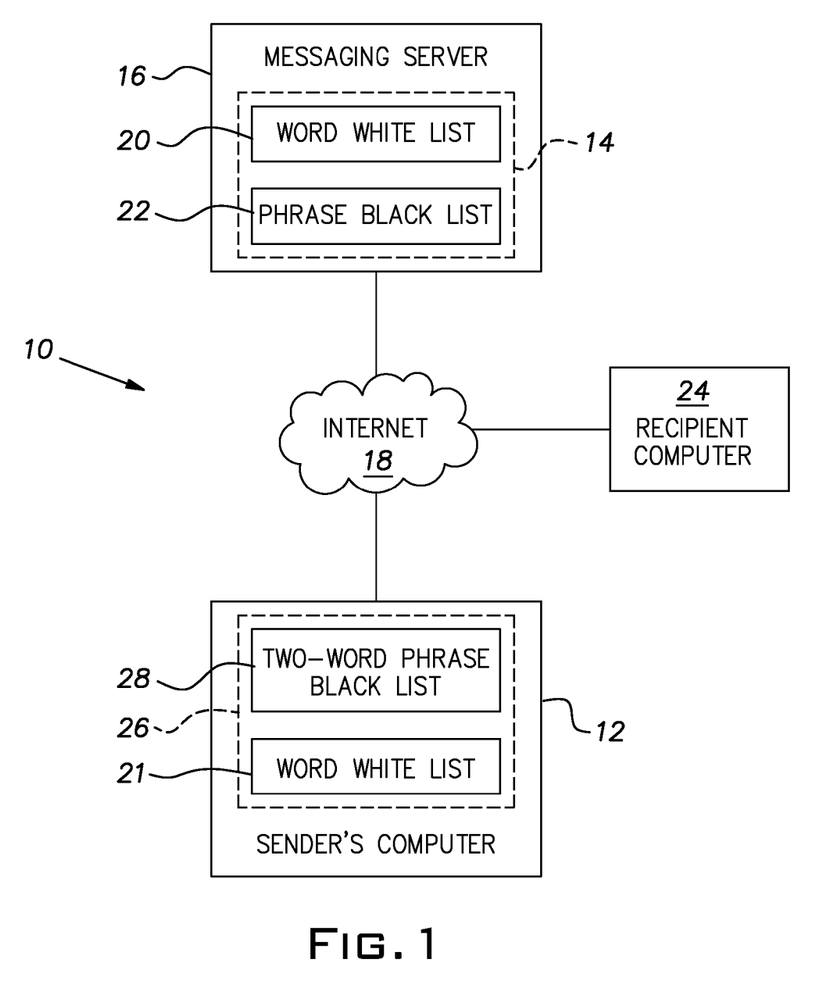
FIG. 1 is a simplified schematic view of a computer network-based messaging system including a multiple-layer chat filter according to an example embodiment of the invention.

Referring to FIG. 1, a simplified schematic view illustrating an example embodiment of a computer network-based messaging system 10 including a multiple-layer chat filter according to an aspect of the present invention. The multiple-layer chat filter is provided to prevent messages containing language considered to be offensive or inappropriate, as determined by an administrator of the system, from being sent by users. According to an aspect of the present invention, the above-mentioned "multiple-layer chat filter" refers to a chat filter that comprises at least two different types of filters that are used together as a single chat filter, which, though a synergy resulting from the combination, is unexpectedly more effective that either filter acting alone. The example embodiment of a multiple-layer chat filter that is specifically described below includes a least one inclusive word filter for limiting the size of the permissible lexicon and at least one exclusive phrase filter for precluding the use of certain enumerated combinations of adjacent words in a message to be transmitted by the messaging system 10. It is also contemplated that other different types of chat filters can be combined to form a multiple-layer chat filter according to the present invention.

As illustrated in FIG. 1, the messaging system 10 according to the illustrated example embodiment includes a user computer, such as a sender's computer 12 connected to a message sending part, such as a messaging server 16, through a computer network, such as the Internet 18. Another user computer, for example a recipient computer 24 as shown in FIG. 1, is also connected to the messaging server 16 through the Internet 18. Other suitable public and/or private networks can be utilized individually or in combination as a substitute for the Internet 18 connections illustrated in FIG. 1. As will be appreciated by one of ordinary skill in the art, the messaging server 16 and the user computers 12, 24 may utilize custom computer hardware and software and/or any suitable commercially available computer hardware and software applications to implement the features of the aspect of the present invention described herein. It will also be appreciated that the specific functionality described below, as well as the differences in functionality between to the described sender's computer 12 and the described recipient's computer 24 are merely representative. The sender's computer 12 and the recipient's computer 24 can both be provided with similar functionality, and additional functionally can be provided as appropriate. Further, any appropriate number of user computers can be connected to the messaging system to allow any number of users to send and receive messages using the messaging system 10. Other possible modifications and additions to the messaging system 10 according to the present invention will be apparent to one of ordinary skill in the art.

Referring still to FIG. 1, the messaging server 16 includes a chat filter subsystem 14 and the sender's computer 12 includes a client-side chat filter module 26. The chat filter subsystem 14 and the client-side chat filter module 26 perform message filtering using a plurality of databases 20, 21, 22, 26, which are lists of words and phrases. In the example embodiment, the client-side chat module includes a client-side white list 21, also referred to as an inclusive dictionary, and a client-side black list 28, also referred to as an exclusive phrase-list. Further, the chat filter subsystem 14 includes a server-side black list 22 and, optionally, a server-side white list 20. It should be appreciated that the schematic diagram of FIG. 1 is not necessarily indicative of the physical location of the lists or databases 20, 21, 22, 28. One of ordinary skill in the art will appreciate that these databases 20, 21, 22, 28 can be stored, separately or together, in any suitable data storage device or devices that are connected for communication with the chat filter subsystem 14 of the messaging server 16 and the client-side chat filter module of the sender's computer 12.

Figure 2:
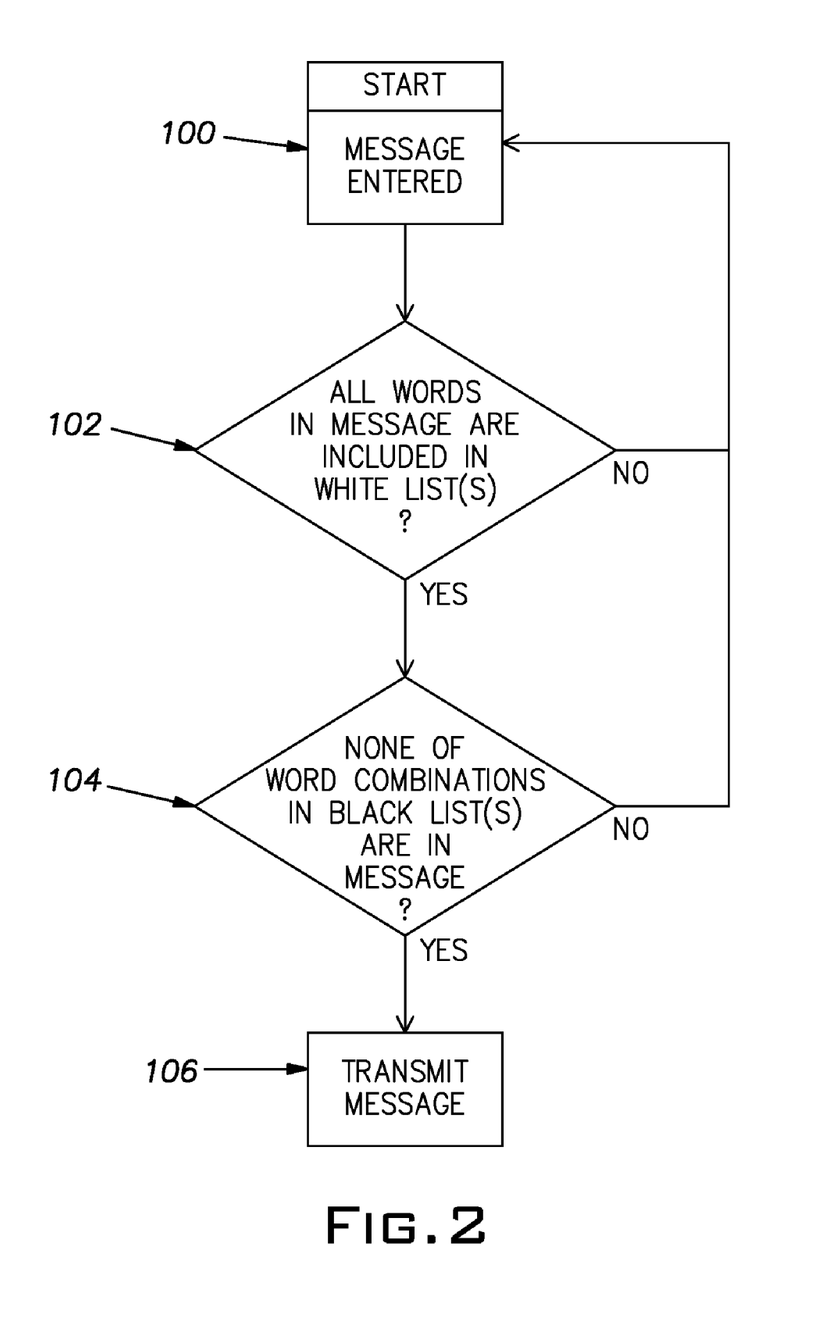
FIG. 2 is a flowchart illustrating a process of filtering and sending a chat message according to an example embodiment of the invention.

As illustrated in FIG. 2, the process of filtering and sending a chat message begins at step 100 when a user (referred to as the "sender" in this example) composes and enters a message into a computer, such as the sender's computer 12 illustrated in FIG. 1. Then, at steps 102 and 104, the messaging system 10 filters the message before transmitting it at step 106 to one or more other computers, such as the recipient computer 24, for viewing by one or more recipients. The message composed by the sender at step 100 includes plurality of words entered into the sender's computer 12 by the sender.

The client-side white list 21 includes a lists "permitted words" that are allowed to be included in the message. With reference to step 102, if the message contains any words not included in the client-side white list 21, then the messaging system 10 will not transmit the message to the recipient computer 24. Further, the black lists 22, 28 contains lists of "prohibited phrases" that are not allowed to be included in the message. According to one embodiment, these prohibited phrases can include phrases that are a combination of a plurality of words that are individually listed in the white lists 20, 21. With reference to step 104, if the message contains any phrases that are included in either of the black lists 22, 28, then the messaging system 10 will not transmit the message to the recipient computer 24. Accordingly, according to an aspect of the present invention, the message will not be transmitted until the conditions of the two filtering steps or layers (steps 102 and 104) are met.

It should be appreciated that the black lists 22, 28 could be made to include phrases that, either intentionally or by mistake, include at least one word that is not also included in one of the white lists 20, 21. It should be understood from the present disclosure that, as a consequence of the white list filtering that is performed at step 102, the inclusion of such phrases is extraneous and unnecessary for the operation of the messaging system 10 and filtering method described herein. Nonetheless, a black list containing such extraneous phrases is still considered to be within the contemplated scope of the present invention. It should be further appreciated that the illustrated order of processing of the white lists 20, 21 (step 102) and the processing of the black lists 22, 28 (step 104) is merely representative, and that it is contemplated that steps 102 and 104 could be performed in any order or be performed concomitantly.

As one of ordinary skill in the art will appreciate, suitable black lists and white lists can be composed and updated as needed by an administrator of the messaging system 10. For purposes of illustration, simplified examples of exclusive phrase-lists, such as the black lists 22, 28 described above, are shown below in Tables 1 and 2.

TABLE 1

EXAMPLE BLACK LIST
(TWO-WORD PHRASES)

big but
do do
my but
under wear
under where
we we
we wee
wee we
your but
you're but

TABLE 2

EXAMPLE BLACK LIST
(LONGER PHRASES)

i hate you
son of a beach
take off your clothes
you are not smart
you no what

As shown in the example embodiment of FIG. 1, the chat filtering is partially performed on the sender's computer 12 and partially performed on the messaging server As illustrated, a client-side chat filter module 26 that is provided on sender's computer works together with a chat filter subsystem 14 of the messaging server 16 to block offensive phrases from being transmitted. The client-side chat filter module 26 uses the client-side black list 28, while the chat filter subsystem 14 of the messaging server 16 uses another black list, the server-side black list 22. The client-side black list 28 and server-side black list 22 both include lists of prohibited phrases that are not allowed to be included in the message. In the presently disclosed example embodiment, the client-side black list 28 includes a list of prohibited two-word phrases, similar to the simple example shown above in Table 1. The client-side filter module 26 uses the client-side white list 21 and the client-side black list 28 to "pre-screen" the message before it is transmitted over the Internet 18 to the messaging server 16. The server-side black list 22, which is used by the chat filter subsystem 14 of the messaging server 16, includes a list of lengthier or more complex prohibited phrases, i.e. phrases made up of three or more words, similar to the example shown above in Table 2.

As noted above, in this example embodiment, the client-side chat filter module 26 causes the sender's computer 12 to perform a partial "pre-screening" of the message for offensive or inappropriate words and phrases. As will be appreciated by one of ordinary skill in the art, by providing the client-side chat filter module 26 many technical benefits may be realized, such as reducing load on the messaging server 16, improving overall throughput of the system 10, etc.

Further, in the example embodiment described above, the client-side white list 21 is used by the messaging system 10 to block messages containing words not deemed to be appropriate. Optionally, the chat filter subsystem 14 may additionally utilize the server-side white list 20 to block such messages. Alternatively, there may be advantages to eliminating the client-side white list 21, such that the chat filter subsystem 14 of the messaging server 16 performs the blocking of messages that contain words not included in the server-side white list 20. For example, this alternative arrangement might provide more security by preventing a sender from viewing and/or altering the white list.

It is also contemplated to be within the scope of the present invention that any suitable combination of white lists and black lists can be provided as appropriate to the client-side chat filter module 26 and/or the chat filter subsystem 14 as determined to be appropriate by one of ordinary skill in the art to meet the needs of a particular system. Furthermore, it is contemplated that the filtering could be performed entirely by the sender's computer 12, or alternatively, that the filtering could be performed entirely by the messaging server 16.

Figure 3:
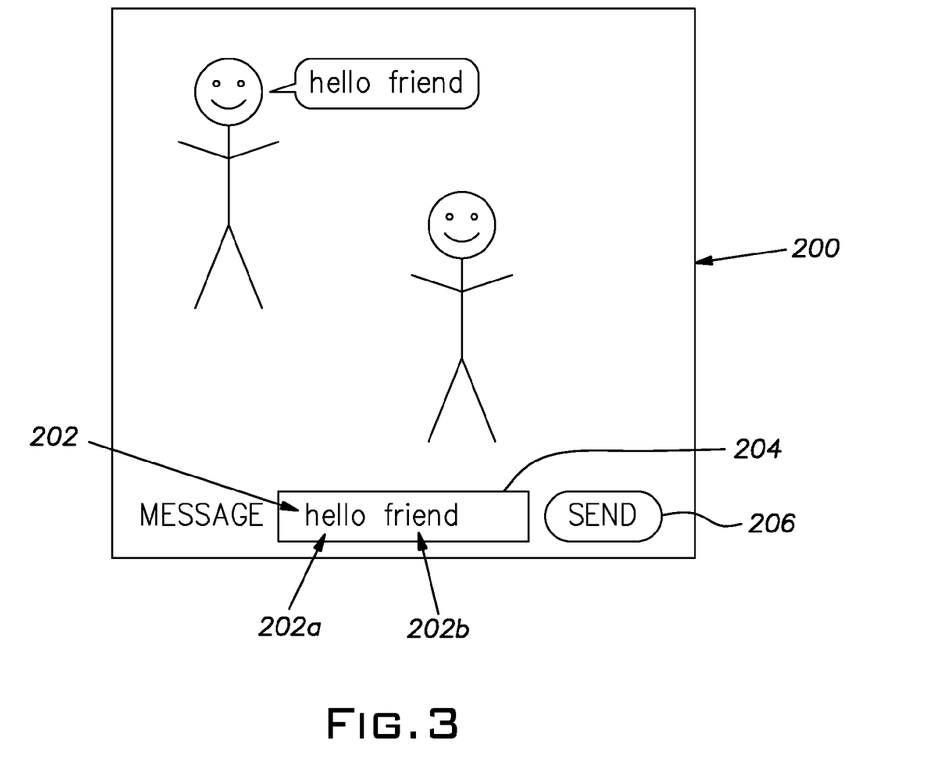
FIG. 3 is a schematic illustration depicting a user interface provided on a user computer according to an example embodiment of the invention.

FIG. 3 illustrates an example implementation of a visual chat interface 200 that permits the sender of a chat message 202 to compose and enter the message into the sender's computer 12, such as in step 100 of the process of filtering and sending a chat message illustrated in FIG. 2. In one of the example embodiments described above with reference to FIG. 1, the client-side chat filter module 26 examines the message entered by the sender to determine whether it contains any of the two-word phrases included in the client-side black list 28. Referring again to FIG. 3, the message 202 is composed as individual words 202a, 202b are entered into a text box 204 on the sender's computer 12. It is noted that, in order for the client-side chat filter module 26 to block a two-word phrase, the individual words comprising the two-word phrase must be found next to each other in the message 202, not merely in the same sentence.

Still referring to FIG. 3, a so-called "highlighting" function of the chat interface 200 will be described. Specifically, when words are entered into the text box 204 on the sender's computer 12 that are not found in the white list(s) 20, 21, or when permitted words are found together to form a prohibited phrase that is found in one of the black lists 22, 28, the chat interface will cause the corresponding words and/or phrases to be highlighted, such as by changing their change color.

This highlighting notifies the sender that the message 202 entered into the text box 204 contains prohibited language and will therefore not be transmitted by the messaging server 16. This gives the sender an opportunity to revise the message 202 so that it no longer contains any prohibited words are phrases before attempting to send it. For example, according to an example embodiment, individual words that are not found in the white list 20 will turn red. Similarly, each of the words that make up an inappropriate phrase that is found in a black list 22, 28 will turn orange. Further, according to the example embodiment, a send function on the sender's computer 12 will be disabled whenever the text box 204 contains prohibited words or phrases. Specifically, a "send" button 206 on the sender's computer is disabled and becomes "grayed out" as long as at least one words in the text box remains highlighted in either orange or red. The sender must remove or change the prohibited words or phrases to eliminate the red or orange text. Once the text box 204 no longer contains any orange or red words, the send function is re-enabled and the send button 206 becomes active again, allowing the sender to click or otherwise trigger the send button 206 to request transmission of the message 202 by the messaging server 16.

As an alternative to the chat interface 200 described above with reference to FIG. 3, in which prohibited words and phrases are highlighted, causing the send button to be disabled, one or more of the described features can be eliminated. It should be appreciated that once a sender knows what words or phrases are prohibited, by virtue of inclusion in black lists and/or exclusion from white lists, it will become easier for the sender to circumvent the message filtering, for example by inventing euphemisms that are not yet included in the black lists. Therefore, it is contemplated that the administrator of a chat site may wish to keep some or all of the contents of the black lists and/or white lists more secretive. One way that this can be accomplished by eliminating the above-described highlighting function. The highlighting function could be eliminated entirely, or highlighting could be performed only for designated words or phrases or only for designated black lists and/or white lists. Thus, although the send button 206 would remain disabled as long as prohibited words or phrases were contained in the text box 204, one or more prohibited phrases may be contained in the text box 204 without highlighting. Since there may be prohibited words and phrases present in the text box 204 that are not highlighted, the sender will have to modify the message 202 through trial and error until the send button 206 becomes re-enabled. As a further possible modification to the chat interface 200, to help keep the contents of the white lists and black list more secretive, the disabling of the send button 206 could be eliminated. In other words, the chat interface 200 would permit the sender to click or otherwise trigger the send button 206 even if prohibited words and phrases were present in the text box 204. The message 202 could then be cleared from the text box 204, and other steps could be taken to give the sender the impression that the message was sent, even though the message would not actually be transmitted to any recipient computers. Thus, it would be more difficult for a sender to determine exactly how messages are being filtered by the messaging system 10. It should be appreciated by one of ordinary skill in the art that one or more of the above-described alternatives and modifications, as well as other modifications to the operation of the chat interface 200, can be utilized as desired without departing from the scope of the present invention.

Furthermore, it should be evident that this disclosure is provided by way of example and that various changes may be made by adding, modifying or eliminating details without departing from the fair scope of the teaching contained in this disclosure. The invention is therefore not limited to particular details of this disclosure except to the extent that the following claims are necessarily so limited.

The invention claimed is:

1. A computer network-based messaging system including a multiple-layer chat filtering system for controlling a content of messages sent by users in the messaging system, the messaging system comprising:
   a computer that receives a message, the message including a plurality of words entered by a sender;
   said computer including one or more data storage devices, storing a word database including a plurality of permitted words which are allowed to be transmitted, and a phrase database including a plurality of prohibited phrases which are not allowed to be transmitted, at least one of the plurality of prohibited phrases consisting of a plurality of individual words that are each individually included in the word database;
   a multiple-layer filter, said multiple-layer filter including a first filter part which uses said permitted words from said word database, and which blocks a first message only if any of the individual words in said first message are not within the permitted words, and a second filter part which uses said prohibited phrases from said phrase database, and blocks the first message only if any of the plurality of prohibited phrases are contained in the message, said computer passing a message only if its individual words are within said word database, and also its individual phrases are not in said phrase database, and where said computer does not pass a message that includes words in said word database and a phrase that is in said phrase database; and
   a message sending part that transmits the message over a computer network only if said message is passed.

2. The messaging system of claim 1, wherein the computer is a user computer that provides a display of the message to the sender prior to the message sending part transmitting the message, and wherein the display highlights words included in the message that are not contained in the word database.

3. The messaging system of claim 1, wherein the computer is a user computer that provides a display of the message to the sender prior to the message sending part transmitting the message, and wherein the display highlights phrases included in the message that are contained in the phrase database.

4. The messaging system of claim 1, wherein the computer is a user computer provides a display of the message to the sender prior to the message sending part transmitting the message, wherein words included in the message that are not contained in the word database highlighted in a first way, and wherein phrases included in the message that are contained in the phrase database are highlighted in a second way that is different than the first way.

5. The messaging system of claim 1, wherein the computer is a user computer that includes a send button for requesting the message sending part to transmit the message, and wherein the user computer disables the send button if at least one of the following conditions exists:
   at least one of the plurality of words entered by the sender are not contained in the word database, and
   at least one of the plurality of prohibited phrases are contained in the message.

6. The messaging system of claim 1, wherein the computer is a user computer that includes a send button for requesting the message sending part to transmit the message, and wherein the user computer permits the sender to trigger the send button and does not inform the sender if the message sending part does not transmit the message.

7. The messaging system of claim 1, wherein the message sending part includes a chat filter subsystem that prevents the message from being transmitted if any of the plurality of words entered by the sender are not contained in the word database.

8. The messaging system of claim 1, wherein the computer is a user computer that includes a client-side chat filter module that prevents the message from being transmitted if any of the plurality of words entered by the sender are not contained in the word database.

9. The messaging system of claim 1, further comprising a chat filter subsystem that includes at least a first database selected from a group consisting the word database and the phrase database, wherein the messaging system transmits at least a second database to a client-side chat filter module on a client computer, the second database being selected from the group consisting of the word database and the phrase database.

10. The messaging system of claim 1, wherein the computer is a user computer that provides a display of the message to the sender prior to the message sending part transmitting the message, and wherein the user computer performs all of the functions of the multiple-layer filter.

11. The messaging system of claim 1, wherein the computer is a messaging server computer remote from the computer, wherein the messaging system further comprises a user computer that provides a display of the message to the sender prior to the message sending part transmitting the message, and wherein the messaging server performs all of the functions of the multiple-layer filter.

12. A computer network-based messaging system including a multiple-layer chat filtering system for controlling content of messages sent by users in the messaging system, the messaging system comprising:
   a computer that receives a message, the message including a plurality of words entered by a sender;
   one or more data storage devices containing: a word database including a plurality of permitted words which are allowed to be transmitted, and a phrase database including a plurality of prohibited phrases which are not allowed to be transmitted, at least one of the plurality of prohibited phrases consisting of a plurality of individual words that are each included in the word database; and
   a message sending part that transmits the message over a computer network only if all of the plurality of words entered by the sender are contained in the word database and none of the plurality of prohibited phrases are contained in the message,
   wherein the phrase database is a first phrase database containing a first plurality of phrases, each of the first plurality of phrases including exactly two words,
   wherein the message sending part includes a chat filter subsystem that prevents the message from being transmitted if any of the first plurality of phrases are included in the message,
   wherein the messaging system further comprises a second phrase database including a second plurality of phrases, each of the second plurality of phrases including at least three words, and
   wherein the computer is a user computer that includes a client-side chat filter module that prevents the message from being transmitted if any of the second plurality of phrases are included in the message.

13. A method of filtering phrases in a computer network-based chat system, the method comprising steps of:
   providing a word database that is stored in at least one data storage device, said word database containing a plurality of permitted words;
   providing a phrase database that is stored in said at least one data storage device, said phrase database containing a plurality of prohibited phrases, at least one of the plurality of prohibited phrases consisting of a plurality of individual words that are each included in the word database;
   comparing each of a plurality of words in a message entered by a sender to the plurality of permitted words in the word database;
   determining phrases in said message, and comparing said phrases to phrase data from the phrase database stored in said at least one data storage device for determining whether any of the plurality of prohibited phrases are contained in the message;
   transmitting the message over a computer network to a recipient computer only if both of the following conditions exist:
      each of the plurality of words entered by the sender matches one of the plurality of permitted words contained in the word database, and
      none of the plurality of prohibited phrases are contained in the message; and
   blocking the message from being sent over the computer network if each of the plurality of words entered by the sender matches one of the plurality of permitted words contained in the word database, and at least one of said prohibited phrases are contained in the message.

14. The method of claim 13, further comprising the steps of:
   providing data for displaying the message on the sender's computer prior to the step of transmitting the message; and
   providing data for highlighting words included in the message that are not contained in the word database.

15. The method of claim 13, further comprising the steps of:
   providing data for displaying the message on the sender's computer prior to the step of transmitting the message; and
   providing data for highlighting phrases included in the message that are contained in the phrase database.

16. The method of claim 13, further comprising the steps of:
   providing data for displaying the message on the sender's computer prior to the step of transmitting the message;
   providing data for highlighting, in a first way, words included the message that are not contained in the word database; and
   providing data for highlighting, in a second way, phrases included in the message that are contained in the phrase database, wherein said second way is different than said first way.

17. The method of claim 16, wherein highlighting in the first way includes turning the words a first color, and wherein highlighting in the second way includes turning the phrases a second color different than the first color.

18. The method of claim 13, further comprising the steps of:
   providing data for displaying the message on the sender's computer prior to the step of transmitting the message;
   providing data for providing a send button on the sender's computer for initiating the step of transmitting the message; and providing data for disabling the send button on the sender's computer if at least one of the following conditions exists:
- at least one of the plurality of words entered by a sender are not contained in the word database, and
- at least one of the plurality of prohibited phrases are contained in the message.

19. The method of claim 13, further comprising the steps of:
providing data for displaying the message on the sender's computer prior to the step of transmitting the message;
providing data for providing a send button on the sender's computer for initiating the step of transmitting the message; and
providing data for permitting a sender to trigger the send button and does not inform the sender if the message is not transmitted by the step of transmitting.

20. The method of claim 13 further comprising:
receiving, by a server computer, the message from the sender's computer, wherein said comparing is performed by the server computer.

21. A computer network-based messaging system including a multiple-layer chat filtering system for controlling the content of messages sent by users in the messaging system, the messaging system comprising:

a server system that receives a message, the message including a plurality of words entered by a sender;

one or more data storage devices including: a word database including a plurality of permitted words which are allowed to be transmitted, and a phrase database including a plurality of prohibited phrases which are not allowed to be transmitted, at least one of the plurality of prohibited phrases consisting of a plurality of individual words that are each included in the word database;

a chat filter subsystem on the server system that includes at least a first database selected from a group consisting the word database and the phrase database, wherein the messaging system provides at least a second database to a client-side chat filter module on a client computer, the second database being selected from the group consisting of the word database and the phrase database; and a message sending part that transmits the message over a computer network only if all of the plurality of words entered by the sender are contained in the word database and none of the plurality of prohibited phrases are contained in the message.

22. The messaging system of claim 21, wherein the message sending part is provided on the server system.

* * * * *